(12) United States Patent
Vanstone et al.

(10) Patent No.: US 6,563,928 B1
(45) Date of Patent: May 13, 2003

(54) STRENGTHENED PUBLIC KEY PROTOCOL

(75) Inventors: Scott A. Vanstone, Waterloo (CA); Alfred John Menezes, Waterloo (CA); Minghua Qu, Waterloo (CA)

(73) Assignee: Certicom Corp., Ontario (CA)

( * ) Notice: Subject to any disclaimer, the term of this patent is extended or adjusted under 35 U.S.C. 154(b) by 0 days.

(21) Appl. No.: 09/283,658

(22) Filed: Apr. 1, 1999

Related U.S. Application Data

(63) Continuation of application No. 08/649,308, filed on May 17, 1996, now Pat. No. 5,933,504.

(30) Foreign Application Priority Data

May 18, 1995 (GB) .............................................. 9510035

(51) Int. Cl.[7] .............................................. H04L 9/00
(52) U.S. Cl. .......................... 380/30; 380/28; 380/285
(58) Field of Search ............................... 380/28, 30, 44, 380/285, 277, 282; 713/170, 171, 180

(56) References Cited

U.S. PATENT DOCUMENTS

| | | | |
|---|---|---|---|
| 4,351,982 A | 9/1982 | Miller et al. ................... | 380/30 |
| 4,405,829 A | 9/1983 | Rivest et al. .................. | 380/30 |
| 4,633,036 A | 12/1986 | Hellman et al. ............... | 380/30 |
| 4,956,863 A | 9/1990 | Goss ............................. | 380/30 |
| 5,150,411 A | 9/1992 | Maurer ......................... | 380/30 |
| 5,159,632 A | 10/1992 | Crandall ....................... | 380/30 |
| 5,271,061 A | 12/1993 | Crandall ....................... | 380/30 |
| 5,272,755 A * | 12/1993 | Miyaji et al. .................. | 380/30 |
| 5,299,263 A | 3/1994 | Beller et al. ................... | 380/30 |
| 5,442,707 A | 8/1995 | Miyaji et al. .................. | 380/30 |
| 5,463,690 A | 10/1995 | Crandall ....................... | 380/30 |
| 5,497,423 A | 3/1996 | Miyaji .......................... | 380/30 |
| 5,581,616 A | 12/1996 | Crandall ....................... | 380/30 |
| 5,600,725 A | 2/1997 | Rueppel et al. ............... | 380/30 |
| 5,625,692 A | 4/1997 | Herzberg et al. ............. | 380/21 |
| 5,724,425 A | 3/1998 | Chang et al. .................. | 380/25 |
| 5,761,305 A | 6/1998 | Vanstone et al. ............. | 380/21 |
| 5,768,388 A * | 6/1998 | Goldwasser et al. .......... | 380/30 |
| 5,987,131 A * | 11/1999 | Clapp .......................... | 713/171 |

OTHER PUBLICATIONS

Abdalla,Bellare,Rogaway;DHIES: An encryption scheme based on the Diffie–Hellman Problem,Sep. 18, 2001, pp. 1–25.*

Tilborg,Elliptic Curver Cryptosystems;too good to be true?; Sep. 2001,pp. 220–225.*

Schroeppel,Orman,O'Malley; Fast Key exchange with Elliptic Curve Systems; Mar. 31, 1995; pp. 1–9.*

Schneier; Applied Cryptography;second edition, 1996, pp. 513–525,480–481.*

* cited by examiner

*Primary Examiner*—Gail Hayes
*Assistant Examiner*—Hosuk Song
(74) *Attorney, Agent, or Firm*—The Maxham Firm

(57) ABSTRACT

A cryptosystem utilizes the properties of discrete logs in finite groups, either in a public key message exchange or in a key exchange and generation protocol. If the group selected has subgroups of relatively small order, the message may be exponentiated by a factor of the order of the group to place the message in a subgroup of relatively small order. To inhibit such substitution, the base or generator of the cryptosystem is chosen to be a generator of a subgroup of prime order or a subgroup of an order having a number of relatively small divisors. The message may be exponentiated to each of the relatively small divisors and the result checked for the group identity. If the group identity is found, it indicates a vulnerability to substitution and is rejected.

145 Claims, 1 Drawing Sheet

STRENGTHENED PUBLIC KEY PROTOCOL

CROSS-REFERENCE TO RELATED APPLICATION

This application is a continuation of U.S. patent application Ser. No. 08/649,308 filed on May 17, 1996, now issued as U.S. Pat. No. 5,933,504.

BACKGROUND OF THE INVENTION

1. Field of the Invention

The present invention relates to public key cryptography.

2. Discussion of Related Art

It is well known that data can be encrypted by utilising a pair of keys, one of which is public and one of which is private. The keys are mathematically related such that data encrypted by the public key may only be decrypted by the private key. In this way, the public key of a recipient may be made available so that data intended for that recipient may be encrypted with the public key and only decrypted by the recipients private key.

One well-known and accepted public key cryptosystem is that based upon discrete logarithms in finite groups. Different finite groups may be used, for example the multiplicative group $Z^*_p$ of integers mod p where p is a prime; the multiplicative group of an arbitrary finite field e.g. $GF2^n$ or an elliptic curve group over a finite field.

The discrete log problem used in such cryptosystems is based on the difficulty of determining the value of an integer x from the value of $\alpha^x$, even where $\alpha$ is known. More particularly, if $\alpha$ is an element of G (which is considered to be written multiplicatively) and $\beta$ is a second element of G, then the discrete logarithm problem in G is that of determining whether there exists an integer x such that $\beta=\alpha^x$, and if so, of determining such a value x.

The Diffie-Hellman key exchange protocol is widely accepted and there are numerous examples of implementations of the Diffie-Hellman protocol in use around the world.

The Diffie-Hellman key agreement protocol is typically stated as follows using as an example the finite group $Z_p^*$:

Setup

The protocol requires a base $\alpha$ that generates a large number of elements of the selected group G and a pair of integers x,y that are retained confidential by respective correspondents A,B. Select a prime number p and let a be $\alpha$ generator of the multiplicative group $Z_p^*$, i.e. the group of integers modulo p.

The Protocol

1. Correspondent A generates a random integer x, computes $\alpha^x$ and sends this to correspondent B.
2. Correspondent B generates a random integer y, computes $\alpha^y$ and sends this to correspondent A.
3. A computes $(\alpha^y)^x = \alpha^{xy}$.
4. B computes $(\alpha^x)^y = \alpha^{xy}$.

A and B now share the common key $\alpha^{xy}$ which may be used as a secret key in a conventional cryptosystem. A similar protocol maybe used in a public key system, generally referred togas an El-Gamal protocol in which each correspondent has a secret key x and a public key $\alpha^x$.

The security of these protocols seems to rest on the intractability of the discrete logarithm problem in the finite group G. It should also be noted that the protocol carries over to any finite group.

The applicants have now recognized that unless the generator $\alpha$ and the group G are selected carefully then the exchange of information may be weak and provide almost no security.

To explain the potential problem, consider the cryptosystem described above using the group $Z_p^*$. The modulus p is public information that defines the cryptosystem and can be expressed as t.Q+1 with $t \geq 2$ and t relatively small. This is always possible since p is odd for large primes (i.e. t could be 2).

Let S be a subgroup of $Z^*_p$ of order t (i.e. it has t elements, each of which is element of $Z_p^*$) and let $\gamma$ be a base for S, i.e. each element of S can be expressed as an integral power of $\gamma$ and raising $\gamma$ to an integral power produces an element that is itself in the subgroup S. If $\alpha$ is a generator for $Z_p^*$, then we can take $\gamma=\alpha^Q$ without loss of generality.

If E is an active adversary in the key exchange protocol between two parties A and B then the attack proceeds as follows:

1. E intercepts the message $\alpha^x$ sent by A and replaces it by $(\alpha^x)^Q=\gamma^x$ and sends it on to entity B.
2. E intercepts the message $\alpha^y$ sent by B and replaces it by $(\alpha^y)^Q=\gamma^y$ and sends it on to entity B.
3. A computes $(\gamma^y)^x=\gamma^{xy}$.
4. B computes $(\gamma^x)^y=\gamma^{xy}$.
5. Although E does not know the key $\gamma^{xy}$, E knows that the common key $\gamma^{xy}$ lies in the subgroup S of order t as $\gamma$ is a generator of S. By definition $\gamma^{xy}$ must produce an element in the subgroup S. Since S is of order t it has precisely t elements. If t is small enough then E can exhaustively check all possibilities and deduce the key.

Since E selects Q, t can always be taken to be 2 and so the threat is practical.

A similar attack may be mounted with cryptosystems using groups other than $Z^*_p$ which will be vulnerable if the element selected as a base or generator generates a subgroup which itself has a small subgroup of order t.

SUMMARY OF THE INVENTION

It is therefore an object of the present invention to provide a method for checking if modification of messages has occurred or in the alternative some method to prevent the attack from being mounted.

In general terms, the present invention is based upon utilization of predefined characteristics of the order of the subgroup.

In one aspect, the base of the cryptosystem is chosen to be a generator of a subgroup of a relatively large prime order. Substitution of any other non-unit generator is of no advantage to an attacker since it does not produce an element in a smaller subgroup that can be exhaustively searched.

In another aspect, factors of the order of the group generated by the base are used to ensure that the key does not lie in or has not been modified to lie in a proper subgroup of relatively small order, i.e. one that may feasibly be exhaustively searched by an interloper.

BRIEF DESCRIPTION OF THE DRAWING

Embodiments of the invention will now be described by way of example only with reference to the accompanying drawings, in which.

DETAILED DESCRIPTION OF THE PREFERRED EMBODIMENTS

Figure 1:
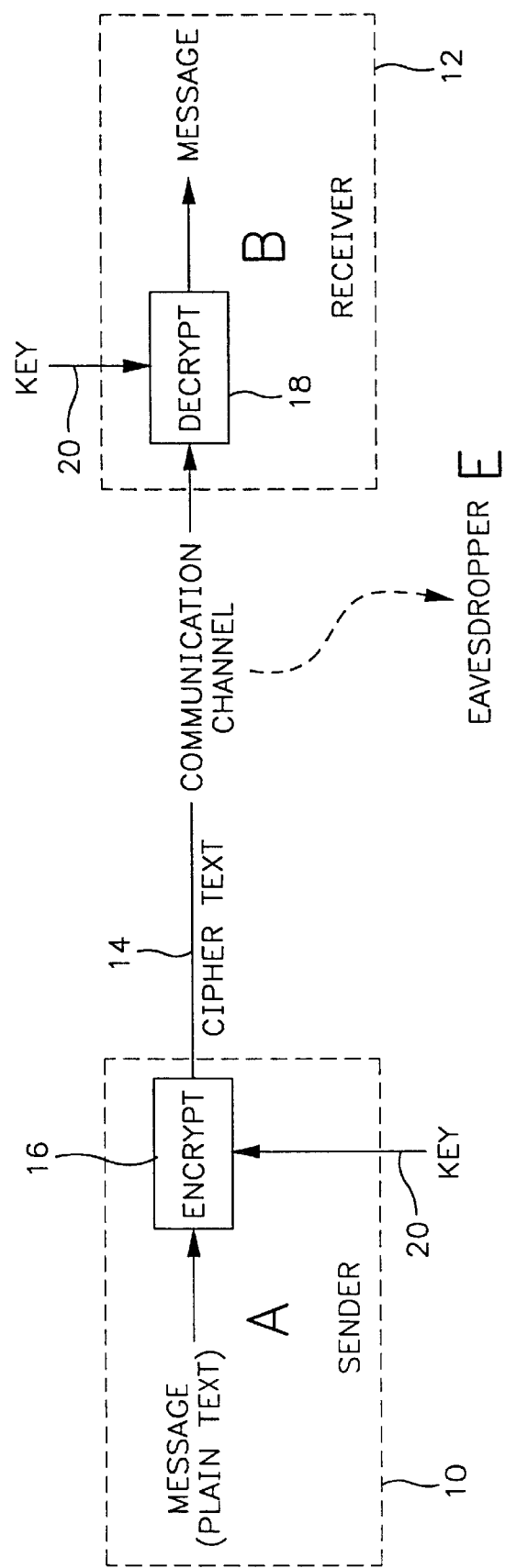
FIG. 1 is a schematic representation of a data communication system.

Referring therefore to FIG. 1, a pair of correspondents, 10,12, denoted as correspondent A and correspondent B, exchange information over a communication channel 14. A cryptographic unit 16,18, is interposed between each of the correspondents 10,12 and the channel 14. A key 20 is associated with each of the cryptographic units 16,18 to convert plain text carried between each unit 16,18 and its respective correspondent 10,12 into ciphertext carried on the channel 14.

In operation, a message generated by correspondent A, 10, is encrypted by the unit 16 with the key 20 and transmitted as ciphertext over channel 14 to the unit 18.

The key 20 operates upon the ciphertext in the unit 18 to generate a plaintext message for the correspondent B, 12. Provided the keys 20 correspond, the message received by the correspondent 12 will be that sent by the correspondent 10.

In order for the system shown in FIG. 1 to operate it is necessary for the keys 20 to be identical and therefore a key agreement protocol is established that allows the transfer of information in a public manner to establish the identical keys. A number of protocols are available for such key generation and most are variants of the Diffie-Hellman key exchange. Their purpose is for parties A and B to establish a secret session key K.

The system parameters for these protocols are a multiplicative group G and a generator a in the group G. Both G and a are known. Correspondent A has private key x and public key $p_A = \alpha^x$. Correspondent B has private key y and public key $p_B = \alpha^y$. Correspondent A and B exchange respective public keys and exponentiate with their private keys to obtain a common session key $\alpha^{xy}$.

As noted above, the key exchange and therefore the ciphertext, is vulnerable if interloper E intercepts the transmission of $\alpha^x$ and $\alpha^y$ and raises each to the power Q.

In a first embodiment, the attack is foiled by defining the system parameters appropriately so that no advantage is provided to the interloper by performing a substitution. Moreover, the base or generator of the cryptosystem is selected so that tampering with the key exchange between A and B can be detected.

By way of example, for a public key system using the group $Z_p\dot{}$, initially a subgroup S of $Z^*_p$ is selected which has a prime order. The subgroup S of prime order q will only have subgroups of order 1 or the prime q itself. For example, if p is chosen as 139 then $Z_{139}\dot{}$ contains subgroups of order 1,2,3,6,23,46,69 and 138. Of these, the subgroups of order 2,3 and 23 are of prime order.

Accordingly, if the base used in the public key system is chosen to be a generator γ of a subgroup S of $Z^*_p$ of prime order q rather than a generator x of $Z_p\dot{}$ itself, an attempt by the interloper to substitute a smaller subgroup may be readily detected.

For example, 34 is a generator of the subgroup of order 23 in $Z_{139}\dot{}$. Therefore the base is chosen to be 34 for key exchange and generation.

The selection of the subgroup S of prime order q restricts the interloper E to an exponent of either 1 or the prime q, i.e. 23 in the example given. If the exponent is chosen to be the order q of the subgroup S then the message produced from the generator of the subgroup exponentiated to q will be the identity element, i.e. 1 in the example given. Therefore one or both correspondents may check the message and if it corresponds to the identity element it is rejected.

Selection by the interloper E of the exponent to be 1 will of course not be of use as the discrete log problem will still be intractable and provided the order of the subgroup is sufficiently large a brute force approach is impractical.

It will of course be understood that the example given of p=139 is for illustrative purposes only and that in practical implementations the prime p will be of the order of $10^{150}$ and the order of the subgroup will typically exceed $10^{40}$.

In a second embodiment, the order of the subgroup need not be prime and the attack is foiled by monitoring the received message. The order of the subgroup may therefore have a number of small divisors, $t_1, t_2$ which are sufficiently small to render the exchange vulnerable. To foil such a substitution, at least one of the correspondents A,B takes the message received from the other correspondent, i.e. $\alpha^x$ for B or $\alpha^y$ for A and raises the message to the power t for each small divisor of (p−1). If the result is 1 it indicates that a new value of the message may have been substituted, as $(\alpha^x)^{Q \cdot t}$ mod (p−1) will always be 1. The fact that the result is 1 is not determinative that a substitution has been made but the probability that $(\alpha^x)^t = 1$ for large values of p is small. The key exchange can be terminated if the result is 1 and a new key exchange initiated. If with different values of private keys x and y successive key exchanges yield a result of 1 when tested above, then it is assumed that an interloper is actively monitoring the data exchange and further communication is terminated.

The determination of the value $\alpha^{xt}$ may be made by exponentiation of the message $\alpha^x$ with the possible values of t by an exhaustive search. Alternatively, given the order of the subgroup, values of the message that yield the group identity can be tabulated and a simple comparison made to determine if the message is vulnerable.

As a third embodiment, the value of p is selected to be of the form 2q+1 where q is itself a prime. The only subgroups of $Z^*_p$ have orders 1,2,q and 2q. The generator of the subgroup of order q is selected for the key exchange so that 't' can only be 1 or q. If the subgroup of order 1 is selected then the message $(\alpha^x)^Q$ will be the identity element, e.g. 1, and this can readily be checked. q will be selected to be relatively large to render an attack on the discreet log problem unfeasible.

The above techniques provide a clear indication of an attempt by an interloper to substitute a subgroup and a foil that is readily implemented by a careful selection of the generator and a check for the identity element.

The above examples have utilized the group $Z_p\dot{}$ but other groups may be used as noted above, for example, an elliptic curve group over a finite field. In the case of an elliptic curve over the field $F_p$ elements where p is a prime power, there is an elliptic curve group G for each integral order lying between $p+1-2\sqrt{p}$ and $p+1+2\sqrt{p}$. With high probability, there is a prime q lying in this interval and by selecting this elliptic curve group, $G_q$, of order q for use in the cryptosystem, the group $G_q$ will only have subgroups of order 1 and the prime q itself. Accordingly, selection of the group $G_q$ will avoid substitution of subgroups of relatively small order and any attempt at substitution will not yield any benefits to the interloper.

A particularly convenient finite field is the field $F_2m$ which may be used for the generation of elliptic curve groups.

As an alternative approach to the selection of a group of prime order, the order of the elliptic curve may be chosen of order n, where n is not a prime and messages are monitored by at least one of the correspondents. The integrity of the message is verified by raising the message to the power d for each small divisor d of the order n. In this case, if the result is the group identity, typically O, then it is assumed that a substitution has been made and the transmission is terminated.

Again, therefore, a group is selected that is either of prime order to inhibit substitution or a group is chosen to have an order with small divisors. In each case, substitution can be checked by monitoring the message by at least one of the correspondents.

Similar considerations will apply in other groups and careful selection of the order of the groups utilized will provide the benefits described above.

An alternative attack that may be utilized is for the interloper E to substitute a new message "e" for that transmitted from A to B and vice versa.

The new message e is chosen to be an element of a subgroup S of the group G of low order, i.e. a relatively small number of elements. When B receives the message e he exponentiates it with his secret key y to generate the session key. Similarly, when A receives the message e he exponentiates it with the secret key x to generate the session key.

Exponentiation of an element of a subgroup will produce an element within that group so that the session keys generated by A and B lie in the subgroup S. If S is of relatively low order, there is a reasonable chance that the keys generated by A and B will be identical. In that case a message encrypted with the session key may be intercepted and the small number of possibilities that exist for the key can be tried by E.

If the keys are not identical then the failure will be attributed to system errors and a new attempt will be made to establish a key. This provides E with a further opportunity to substitute a different element of the subfield S in the transmission with a real probability that a correspondence will be established. Because of the relatively small number of possible elements, the possibilities may be exhausted and a correspondence made within the normal operating parameters of the system.

To overcome this possibility, the order of the group is selected to have factors that are either large primes or provide trivial solutions that disclose themselves upon simple examination. In the case of the group $Z_p\dot{}$, a suitable form is for the value of the modulus p to be of the form $2qq'+1$ where q and q' are both large primes. The subgroups S of $Z^*_p$ will be of order 2, q or q'. Adopting a subgroup of order 2 will provide only two possible elements which can readily be checked and, if present as the session key, the session can be terminated.

The values of q and q' will not be readily ascertained due to the difficulty of factoring the products of large primes.

Even if an exhaustive attack on the subgroup of order q or q' is viable for E, such an attack will reveal itself by a large number of repeated attempts at establishing communication. Accordingly, an upper limit may be established after which communication will be terminated. The appropriate number of attempts will be based on the factors of p−1 and the nature of the communication system.

Again, therefore, the attacks by E can be resisted by checking for values of the session key that are indicative of the vulnerability of the session and by appropriate selection of the order of the group. It will be recognised that selection of the modulus of the form $2q+1$ as exemplified in the third embodiment above provides the requisite robustnesss for resisting a substitution attack by E.

These techniques are also effective to prevent interloper E from taking a known public key $\alpha^a$, raising it to an appropriate power such that $\alpha^{aQ}$ is in a small subgroup. The interloper can then determine aQ, and use this as his private key. There are situations where the interloper can use this to impersonate correspondent A and also convince a certifying authority to certify the public key $\alpha^{aQ}$ since the interloper E can prove he knows aQ.

In the above examples, the checking for elements lying in subgroups of relatively small order has been performed by exponentiating the message to the power of the small divisors of the order of the group. An alternative method which will indicate whether or not the message lies in a proper subgroup, without necessarily identifying the order of the subgroup, is to exponentiate the message to the order n/p where n is the order of the group G and p ranges over all prime divisors of n. If the result is the group identity (1 in the case of $Z_p\dot{}$) then it indicates that the message does lie in a subgroup. Depending upon the strategy used to determine the order of the group G, it is possible either to reject the message or to test further to determine the order of the subgroup.

What is claimed is:

1. A method of determining the integrity of a message exchanged between a pair of correspondents, said message being secured by embodying said message in a function of $\alpha^x$ where $\alpha$ is an element of a finite group S of order q, said method comprising the steps of at least one of the correspondents receiving public information $\alpha^x$ where x is an integer selected by another of said correspondents, determining whether said public information $\alpha^x$ lies within a subgroup of S having less than a predetermined number of elements and rejecting messages utilizing said public information if said public information lies within such a subgroup.

2. A method according to claim 1 wherein said order q is a prime number.

3. A method according to claim 2 wherein said message is a component of a session key $\alpha^{xy}$ where y is an integer selected by said one correspondent.

4. A method according to claim 1 wherein said group is a multiplicative group $Z^*_p$ of integers mod p where p is a prime.

5. A method according to claim 4 wherein said modulus p is of the form $2r+1$ and r is a prime.

6. A method according to claim 4 wherein said modulus p is of the form $nrr'+1$ and r and r' are relatively large primes.

7. A method according to claim 4 wherein said message is examined by operating upon said public information by a value t where t is a divisor of q and determining whether the resultant value corresponds to the group identity.

8. A method according to claim 4 wherein said group S is a subgroup of a group G of order n.

9. A method according to claim 4 wherein said message is a component of a session key $\alpha^{xy}$ where y is an integer selected by said one correspondent.

10. A method according to claim 9 wherein said message is examined by operating upon said public information by a value t where t is a divisor of q and determining whether the resultant value corresponds to the group identity.

11. A method according to claim 4 wherein said modulus p is of the form $2rr'+1$ and r and r' are prime.

12. A method according to claim 4 wherein said group G is an elliptical curve group over a finite field $F_2m$.

13. A method according to claim 12 wherein said message is examined by operating upon said public information by a value t where t is a divisor of n and determining whether the resultant value corresponds to the group identity.

14. A method according to claim 13 wherein said message is a component of a session key $\alpha^{xy}$ where y is an integer selected by said one correspondent.

15. A method according to claim 14 wherein said message is examined by operating upon said public information by a value t where t is a divisor of n and determining whether the resultant value corresponds to the group identity.

16. A method according to claim 1 wherein said group is a multiplicative group of a finite field.

17. A method according to claim 1 wherein said group is an elliptical curve group over a finite field.

18. A method according to claim 17 wherein said group S is a subgroup of a group G of order n.

19. A method according to claim 17 wherein said message is a component of a session key $\alpha^{xy}$ where y is an integer selected by said one correspondent.

20. A method according to claim 1 wherein said group is over a finite field $F_{2^m}$.

21. A method according to claim 20 wherein said group is an elliptic curve group.

22. A method according to claim 21 wherein said message is examined by operating upon said public information by a value t where t is a divisor of q and determining whether the resultant value corresponds to the group identity.

23. A method according to claim 21 wherein said message is a component of a session key $\alpha^{xy}$ where y is an integer selected by said one correspondent.

24. A method according to claim 23 wherein said message is examined by operating upon said public information by a value t where t is a divisor of q and determining whether the resultant value corresponds to the group identity.

25. A method according to claim 19 wherein said message is examined by operating upon said public information by a value t where t is a divisor of q and determining whether the resultant value corresponds to the group identity.

26. A method according to claim 1 wherein said message is a component of a session key $\alpha^{xy}$ where y is an integer selected by said one correspondent.

27. A method according to claim 26 wherein said message is examined by operating upon said public information by a value t where t is a divisor of q and determining whether the resultant value corresponds to the group identity.

28. A method according to claim 1 wherein said message is examined by operating upon said public information by a value t where t is a divisor of q and determining whether the resultant value corresponds to the group identity.

29. A method according to claim 28 wherein a plurality of values of t are utilized and each resultant value compared to the group identity.

30. A method according to claim 1 wherein said determination includes the step of operating on said message by an operator q/p where q is the order of the group S and p ranges over all prime divisors of q.

31. A method according to claim 1 wherein said group is over a finite field.

32. A method of determining the integrity of a message exchanged between a pair of correspondents, said message being secured by embodying said message in a function of $\alpha^x$ where $\alpha$ is an element of a finite group S of order q and said group S is a subgroup of a finite group G of order n, said method comprising the steps of at least one of the correspondents receiving public information $\alpha^x$ where x is an integer selected by another of said correspondents, determining whether said public information $\alpha^x$ lies within a subgroup S of G having less than a predetermined number of elements and rejecting messages utilizing said public information if said public information lies within such a subgroup.

33. A method according to claim 32 wherein q is a prime number.

34. A method according to claim 33 wherein said determination is made by operating on said message by an operator n/p where p ranges over all prime divisors of n.

35. A method according to claim 34 wherein said operation includes exponentiation of said message and said determination is made by examination for a group identity.

36. A method according to claim 33 wherein said message is examined by operating upon said public information by a value t where t is a divisor of n and determining whether the resultant value corresponds to the group identity.

37. A method according to claim 33 wherein said message is a component of a session key $\alpha^{xy}$ where y is an integer selected by said one correspondent.

38. A method according to claim 37 wherein said message is a component of a session key $\alpha^{xy}$ where y is an integer selected by said one correspondent.

39. A method according to claim 33 wherein said group G is a multiplicative group of a finite field.

40. A method according to claim 33 wherein said group G is a multiplicative group $Z^*_p$ of integers mod p where p is a prime.

41. A method according to claim 40 wherein said message is examined by operating upon said public information by a value t where t is a divisor of n and determining whether the resultant value corresponds to the group identity.

42. A method according to claim 40 wherein said message is a component of a session key $\alpha^{xy}$ where y is an integer selected by said one correspondent.

43. A method according to claim 42 wherein said message is examined by operating upon said public information by a value t where t is a divisor of n and determining whether the resultant value corresponds to the group identity.

44. A method according to claim 40 wherein said modulus p is of the form 2r+1 and r is a prime.

45. A method according to claim 33 wherein said group G is an elliptical curve group over a finite field.

46. A method according to claim 45 wherein said message is examined by operating upon said public information by a value t where t is a divisor of n and determining whether the resultant value corresponds to the group identity.

47. A method according to claim 45 wherein said message is examined by operating upon said public information by a value t where t is a divisor of n and determining whether the resultant value corresponds to the group identity.

48. A method according to claim 33 wherein said group G is an elliptical curve group over a finite field $F_{2^m}$.

49. A method according to claim 48 wherein said message is examined by operating upon said public information by a value t where t is a divisor of n and determining whether the resultant value corresponds to the group identity.

50. A method according to claim 48 wherein said message is a component of a session key $\alpha^{xy}$ where y is an integer selected by said one correspondent.

51. A method according to claim 48 wherein said message is examined by operating upon said public information by a value t where t is a divisor of n and determining whether the resultant value corresponds to the group identity.

52. A method according to claim 33 wherein said group is over a finite field.

53. A method of establishing a session key for encryption of data between a pair of correspondents comprising the steps of one of said correspondents selecting a finite group G, establishing a subgroup S having an order q of the group G, determining an element $\alpha$ of the subgroup S to generate greater than a predetermined number of the q elements of the subgroup S and utilising said element $\alpha$ to generate a session key at said one correspondent.

54. A method according to claim 53 wherein said order q of said subgroup S is a prime.

55. A method according to claim 53 including the step of receiving at one of said correspondents a message $\alpha^x$, where x is an integer selected by an other of said correspondents, exponentiating said message $\alpha^x$ to a value t where t is a divisor of the order of the subgroup, comparing a resultant value $\alpha^{xt}$ to the group identity and preventing establishment of said session key if said value corresponds to the group identity.

56. A method according to claim 55 wherein a plurality of values of t are utilized and each resultant value compared to the group identity.

57. A method according to claim 55 wherein said message is examined by operating upon said public information by a value t where t is a divisor of q and determining whether the resultant value corresponds to the group identity.

58. A method according to claim 53 wherein said order of said subgroup is of the form utilising an integral number of a product of a plurality of large primes.

59. A method according to claim 58 wherein the order of said subgroup is of the form nrr' where n, r and r' are each integers and r and r' are each prime numbers.

60. A method according to claim 59 wherein n has a value of 2.

61. A method according to claim 53 wherein said subgroup is selected to have an order that is to be a function of the product of a pair of primes r,r' and said element $\alpha$ is a generator of a subgroup of an order of one of said primes r,r'.

62. A method according to claim 53 including the step of determining whether information received by one of the correspondents sharing said session key lies within a subgroup of S having less than a predetermined number of elements and rejecting said information if it lies within such a subgroup.

63. A method according to claim 53 wherein said group is an elliptical curve group G over a finite field.

64. A method according to claim 63 wherein said elliptic curve group is over the finite field $F_p$ where p is a prime power.

65. A method according to claim 53 wherein said group is over a finite field $F_{2^m}$.

66. A method according to claim 65 wherein said group is an elliptic curve group.

67. A method according to claim 66 wherein the order q of said subgroup S is prime.

68. A method of establishing a session key of the form $\alpha^{xy}$ for encryption of data between a pair of correspondents having respective private keys x, and y comprising the steps of selecting an elliptic curve over a field of prime order p having p elements, said elliptic curve having a prime order q, to provide q points on the curve, determining an element $\alpha$ of a group G comprising said q points to generate the q elements of the group G and utilising said element $\alpha$ to generate a session key of the form $\alpha^{xy}$ at each correspondent where x is an integer selected by one of the correspondents and y is an integer selected by another of said correspondents, whereby the order of the curve q is selected such that the intractability of the discrete log problem inhibits recovery of the private keys x or y.

69. A method according to claim 68 including the step of one of said correspondents determining the number of elements of the group G and terminating establishment of said session key if said number is less than a predetermined number of elements.

70. A method according to claim 68 including the step of one of said correspondents determining if the information received from the other correspondent corresponds to the group identity.

71. A method according to claim 68 including the step of checking that said order q is prime.

72. A method according to claim 71 wherein said order q is greater than $10^{40}$.

73. A method of establishing by way of a discrete log key agreement scheme a session key for encryption of data between a pair of correspondents comprising the steps of selecting a finite group G, establishing a subgroup S having an order q of the group G, determining an element $\alpha$ of the subgroup S to generate greater than a predetermined number of the q elements of the subgroup S and utilising said element $\alpha$ to generate a session key at each corespondent.

74. A method according to claim 73 wherein each of said correspondents have respective private keys x and y and said session key is of the form $\alpha^{xy}$.

75. A method according to claim 74 wherein said subgroup S is of prime order.

76. A method according to claim 75 wherein at least one of said correspondents ascertains whether information received from said other correspondent corresponds to the group identity.

77. A method according to claim 74 wherein said group G is an elliptic curve group.

78. A method of establishing a session key for encryption of data between a pair of correspondents comprising the steps of selecting a finite field of order n, establishing a subgroup S having an order q of the multiplicative group of the finite field, determining an element $\alpha$ of the subgroup S to generate greater than a predetermined number of the q elements of the subgroup S and utilising said element $\alpha$ to generate a session key at each corespondent.

79. A method according to claim 78 wherein said order q of said subgroup S is a prime.

80. A method according to claim 78 wherein said order n is a prime of the form 2q+1 and q is prime.

81. A method according to claim 78 wherein said order n is a prime of the form rq+1 and r is small and q is prime.

82. A method according to claim 78 wherein said order n is a prime of the form 2qq'+1 and q and q' are prime.

83. A method according to claim 78 wherein said order n is a prime of the form rqq'+1 and r is small, and q and q' are prime.

84. A method according to claim 78 wherein said order n is a prime of the form 2qq'+1 and q is prime and q' is the product of a plurality of large primes.

85. A method according to claim 78 wherein said order n is a prime of the form rqq'+1 where r is small, q is prime, and q' is the product of a plurality of large primes.

86. A method of establishing a session key for encryption of data between a pair of correspondents comprising the steps of selecting an elliptic curve group of order n over a finite field, establishing a subgroup S having an order q of the elliptic curve group, determining an element $\alpha$ of the subgroup S to generate greater than a predetermined number of the q elements of the subgroup S and utilising said element $\alpha$ to generate a session key at each corespondent.

87. A method according to claim 86 wherein said order q of said subgroup S is a prime.

88. A method according to claim 86 wherein said finite field is a finite field $F_p$.

89. A method according to claim 88 wherein said order q of said subgroup S is a prime.

90. A method according to claim 86 wherein said finite field is a finite field $F_{2^m}$.

91. A method according to claim 90 wherein said order q of said subgroup S is a prime.

92. A method of establishing a session key for encryption of data between a pair of correspondents comprising the steps of selecting a group of order n over a finite field, establishing a subgroup S having an order q of said group, determining an element α of the subgroup S to generate greater than a predetermined number of the q elements of the subgroup S and utilising said element α to generate a session key at each corespondent.

93. A method according to claim 51 wherein said order q of said subgroup S is a prime.

94. A method of establishing by way of a discrete log key agreement scheme a session key for encryption of data between a pair of correspondents comprising the steps of selecting a finite field of order n, establishing a subgroup S having an order q of the group G, determining an element α of the subgroup S to generate greater than a predetermined number of the q elements of the subgroup S and utilising said element α to generate a session key at each correspondent.

95. A method according to claim 94 wherein said order q of said subgroup S is a prime.

96. A method according to claim 94 wherein said order q of said subgroup S is a prime.

97. A method according to claim 94 wherein said order n is a prime of the form 2q+1 and q is prime.

98. A method according to claim 94 wherein said order n is a prime of the form rq+1 and r is small and q is prime.

99. A method according to claim 94 wherein said order n is a prime of the form 2qq'+1 and q and q' are prime.

100. A method according to claim 94 wherein said order n is a prime of the form rqq'+1 and r is small, and q and q' are prime.

101. A method according to claim 94 wherein said order n is a prime of the form 2qq'+1 and q is prime and q' is the product of a plurality of large primes.

102. A method according to claim 94 wherein said order n is a prime of the form rqq'+1 where r is small, q is prime, and q' is the product of a plurality of large primes.

103. A method of establishing by way of a discrete log key agreement scheme a session key for encryption of data between a pair of correspondents comprising the steps of selecting an elliptic curve group of order n over a finite field, establishing a subgroup S having an order q of the elliptic curve group, determining an element α of the subgroup S to generate greater than a predetermined number of the q elements of the subgroup S and utilising said element α to generate a session key at each corespondent.

104. A method according to claim 103 wherein said order q of said subgroup S is a prime.

105. A method according to claim 103 wherein said finite field is a finite field $F_p$.

106. A method according to claim 105 wherein said order q of said subgroup S is a prime.

107. A method according to claim 103 wherein said finite field is a finite field $F_{2^m}$.

108. A method according to claim 107 wherein said order q of said subgroup S is a prime.

109. A method of establishing a session key of the form $\alpha^{xy}$ for encryption of data between a pair of correspondents having respective private keys x and y comprising the steps of selecting an elliptic curve group of order n over a finite field, establishing a subgroup S having an order q of the elliptic curve group, determining an element α of the group G to generate the q elements of the group G and utilising said element α to generate a session key of the form $\alpha^{xy}$ at each corespondent where x is an integer selected by one of said correspondents and y is an integer selected by another of said correspondents.

110. A method according to claim 109 wherein said finite field is a finite field $F_p$.

111. A method according to claim 110 wherein said order q of said subgroup S is a prime.

112. A method according to claim 109 wherein said finite field is a finite field $F_{2^m}$.

113. A method according to claim 112 wherein said order q of said subgroup S is a prime.

114. A method of establishing by way of a discrete log key agreement scheme a session key for encryption of data between a pair of correspondents comprising the steps of selecting an elliptic curve over a field of prime order p having p elements, said elliptic curve having a prime order q to provide q points on the curve greater than a predetermined number of points sufficient to avoid vulnerability in a cryptographic system, determining an element α of the group G to generate the q elements of the group G, and utilising said element α to generate a session key at each correspondent.

115. A method according to claim 114 including the step of checking that said order q is prime.

116. A method according to claim 114 wherein said order q is greater than $10^{40}$.

117. A method of establishing by way of a discrete log key agreement scheme a session key for encryption of data between a pair of correspondents comprising the steps of selecting a group G of prime order q over a finite field, determining an element α of the group G to generate the q elements of the group G, and utilising said element α to generate a session key at each correspondent.

118. A method according to claim 117 including the step of checking that said order q is prime.

119. A method of establishing a session key of the form $\alpha^{xy}$ for encryption of data between a pair of correspondents having respective private keys x and y comprising the steps of selecting a group G of prime order q over a finite field, determining an element α of the group G to generate the q elements of the group G and utilising said element α to generate a session key of the form $\alpha^{xy}$ at each corespondent where x is an integer selected by one of said correspondents and y is an integer selected by another of said correspondents.

120. A method according to claim 119 including the step of checking that said order q is prime.

121. A method according to claim 119 wherein said order q is greater than $10^{40}$.

122. A discrete log based key agreement system to permit a message to be exchanged between a pair of correspondents in a data communication system, said system utilising a group G of order n and having a generator and wherein said message is secured by embodying said message in a function of x where x is an integer, said system having a predefined parameter of a finite group S of order q, which is a subgroup of the group G and itself has no sub groups with less than a predetermined number of elements sufficient to avoid vulnerability in a cryptographic system.

123. A system according to claim 122 wherein at least one of said correspondents includes a monitor to determine whether said message corresponds to a group identity.

124. A cryptographic unit for use in a data communication system established between a pair of correspondents exchanging public information across a communication channel by way of a public key encryption scheme operating in a finite group G, said unit including a monitor to receive public information from one of said correspondents and examine said public information to determine whether it lies within a subgroup S of group G having less than a predetermined number of elements.

125. A method according to claim 32 wherein said determination is made by operating on said message by an operator n/p where p ranges over all prime divisors of n.

126. A method according to claim 125 wherein said operation includes exponentiation of said message and said determination is made by examination for a group identity.

127. A method according to claim 32 wherein said message is examined by operating upon said public information by a value t where t is a divisor of n and determining whether the resultant value corresponds to the group identity.

128. A method according to claim 32 wherein said message is a component of a session key $\alpha^{xy}$ where y is an integer selected by said one correspondent.

129. A method according to claim 128 wherein said message is examined by operating upon said public information by a value t where t is a divisor of q and determining whether the resultant value corresponds to the group identity.

130. A method according to claim 129 wherein said message is examined by operating upon said public information by a value t where t is a divisor of q and determining whether the resultant value corresponds to the group identity.

131. A method according to claim 32 wherein said message is a component of a session key $\alpha^{xy}$ where y is an integer selected by said one correspondent.

132. A method according to claim 131 wherein said message is examined by operating upon said public information by a value t where t is a divisor of n and determining whether the resultant value corresponds to the group identity.

133. A method according to claim 132 wherein said message is examined by operating upon said public information by a value t where t is a divisor of n and determining whether the resultant value corresponds to the group identity.

134. A method according to claim 32 wherein said group G is a multiplicative group of a finite field.

135. A method according to claim 32 wherein said group G is a multiplicative group $Z_p^{\cdot}$ of integers mod p where p is a prime.

136. A method according to claim 135 wherein said message is examined by operating upon said public information by a value t where t is a divisor of n and determining whether the resultant value corresponds to the group identity.

137. A method according to claim 135 wherein said message is a component of a session key $\alpha^{xy}$ where y is an integer selected by said one correspondent.

138. A method according to claim 137 wherein said message is examined by operating upon said public information by a value t where t is a divisor of n and determining whether the resultant value corresponds to the group identity.

139. A method according to claim 135 wherein said modulus p is of the form 2r+1 and r is a prime.

140. A method according to claim 32 wherein said group G is an elliptical curve group over a finite field.

141. A method according to claim 140 wherein said message is examined by operating upon said public information by a value t where t is a divisor of n and determining whether the resultant value corresponds to the group identity.

142. A method according to claim 140 wherein said message is a component of a session key $\alpha^{xy}$ where y is an integer selected by said one correspondent.

143. A method according to claim 11 wherein said message is examined by operating upon said public information by a value t where t is a divisor of n and determining whether the resultant value corresponds to the group identity.

144. A method according to claim 32 wherein said group is over a finite field.

145. A method according to claim 17 wherein said message is examined by operating upon said public information by a value t where t is a divisor of q and determining whether the resultant value corresponds to the group identity.

\* \* \* \* \*